MAGNETOSTRICTIVE DELAY LINE DRIVER

Filed July 9, 1965

INVENTOR
JOHN W. SUMILAS

BY John C Black
ATTORNEY 3,344,321

MAGNETOSTRICTIVE DELAY LINE DRIVER

John W. Sumilas, Wappingers Falls, N.Y., assignor to International Business Machines Corporation, Armonk, N.Y., a corporation of New York Filed July 9, 1965, Ser. No. 470,792
5 Claims. (Cl. 317—148.5)

This invention relates to improvements in drive circuits for inductive loads and more particularly for high speed magnetostrictive delay lines.

In data processing apparatus, magnetostrictive delay lines are sometimes used as data storage devices. Since data is stored within the delay line dynamically, much of the data must be regenerated and returned to storage via the drive transducer subsequent to its reaching the pickup transducer at the end of the line.

Timing pulses from a clock and various circuits selectively control the data regeneration. As a result, the pulse width of the data, as well as the timing of the data entry into the delay line, are critical in order to assure the reliable regeneration of the data.

Since the amount of data which can be stored in the delay line is porportional to the data cycle rate, relatively high rates in the order of 1 megacycle or greater are chosen.

Moreover, due to the characteristics of the delay line construction, substantially equal rise and fall times for the drive transducer pulses must be provided in order to assure optimum output signal levels and minimum distortion. For example, in a typical application in which the data cycle rate is in the order of 1 megacycle, the nominal data pulse width will be in the order of 500 nanoseconds; and the rise and fall times of the current pulse into the delay line transducer coil must be maintained to relatively equal, small values in the order of 150 nanoseconds.

Furthermore, the transducer drive circuit responds to input pulses, and the widths and the rise and fall times of these pulses must be carefully controlled. In addition, there must be a minimum amount of delay between the leading edges of the input pulse to the drive circuit and the leading edge of the current pulse to the transducer coil if the data is to be maintained compatible with the clock timing, which is common to both the input and output transducers.

It is also required that the amplitude of the coil drive current must be maintained within some small tolerance (equal to or less than ±10%) of the nominal drive current. This tolerance must be at all times, independent of data pulse patterns. Therefore, the drive must not be "pattern sensitive." "Pattern sensitivity" is denoted as changes in coil drive current amplitude as a result of driver response to long series of consecutive data bits (logic "1's") preceded by long series of idle cycle (logic "0's"), or any other pulse program. "Pattern sensitivity" results from the fact that the inductor-current source is not an ideal current source but does exhibit some finite time constant.

In the past, the use of magnetostrictive delay lines has been generally in environments within which it was possible to provide relatively high voltage supplies in the order of 20 volts or more for driving the delay line drive coil.

However, with the advent of the microminiaturization of circuit components, supply voltages have been drastically reduced to values in the order of from 3–6 volts, at least partly due to the need for lower heat producing, power consumption. Where separate high voltage power supplies cannot be justified for the delay line drivers, it is necessary to utilize the existing low voltage supplies. Known driver circuits do not operate satisfactorily at the higher speeds with the low voltage supplies; and the need arises for a reliable, high speed driver utilizing a low voltage supply.

Accordingly, it is a primary object of the present invention to provide an improved drive circuit for a magnetostrictive delay line which utilizes a relatively low voltage source.

It is another important object of the present invention to provide an improved drive circuit for a magnetostrictive delay line which can be reliably operated at very high speeds.

A preferred embodiment of the present invention achieves the above-mentioned objects by providing a substantially constant current source for the transducer drive coil and an alternate path for said constant current source including an impedance which is dynamically matched with respect to the impedance of the transducer coil at the operating frequency. Two transistor switches are operated alternatively to direct the current either through the transducer coil or through the alternate impedance path. When the electronic switches are controlled to switch current from the impedance path into the transducer coil, there is essentially no change in the amount of current flowing from the constant current source because of the design of the constant current source itself and because of the dynamic balancing of the two current paths, one of which includes the transducer coil.

In one embodiment the constant current source includes an inductance, the minimum value of which is substantially higher, for example, by a factor of ten, than that of the transducer coil. In accordance with the Law of Constant Flux Linkages, when the current is switched from the impedance path to the transducer coil path, the current flowing through the larger inductor, and therefore through the transducer itself, does not change instantly. Hence, the rise time of the current through the transducer coil is very rapid and the amount of current through the coil is reliably controlled. In a preferred embodiment, the input coupling to the switches for each of the current paths includes means for assuring substantially equal rise and fall times for the current pulse through the transducer coil.

The foregoing and other objects, features and advantages of the invention will be apparent from the following more particular description of the preferred embodiments of the invention, as illustrated in the accompanying drawings.

Figure 1:
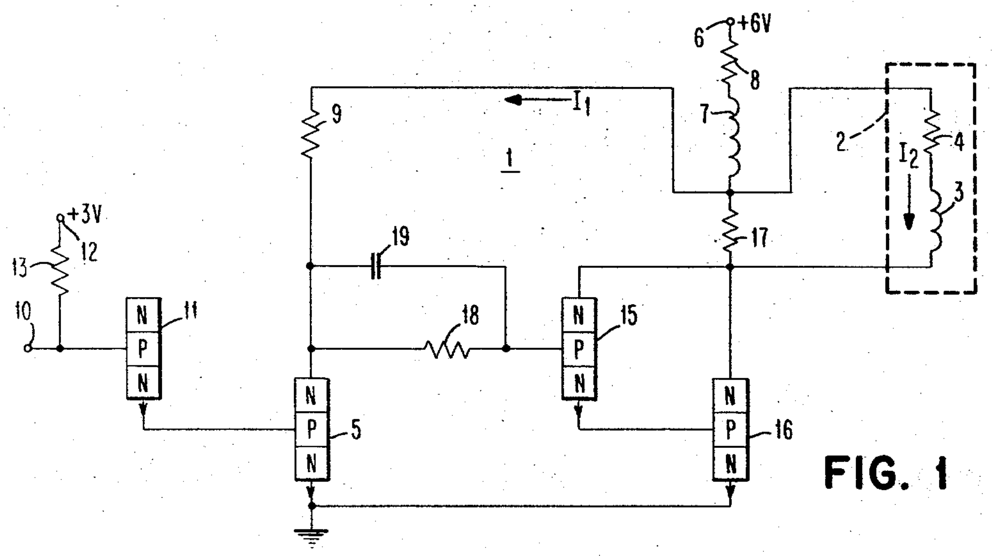
FIG. 1 is a schematic diagram of one form of the present invention.

The embodiment shown in FIG. 1 comprises a drive circuit 1 for a transducer 2. The transducer 2 includes a coil having an inductive impedance 3 and a resistive impedance 4.

The driver circuit 1 includes a first transistor 5 having its emitter connected to ground potential and having its collector connected to a positive supply terminal 6 by way of an inductor 7 and resistors 8 and 9.

Input data signals are applied to a terminal 10 from a source (not shown). The terminal 10 is connected to the base electrode of the transistor 5 by way of the base-emitter junction of a transistor 11 utilized as a diode. The transistor 11 which is utilized as a diode, slows the input rise time as a function of the time delay inherent in forward biasing the base-emitter junction. The input terminal 10 is also connected to a positive supply terminal 12 by way of a resistor 13.

The drive circuit 1 includes a second switch comprising a pair of transistors 15 and 16 connected in the form of a Darlington pair. The emitter electrode of the transistor 16 is connected to ground potential and the collector electrode is connected to the transducer 2 and to a damping resistor 17. The transducer and damping resistor are connected to the inductor 7. The base electrode of the transistor 15 is connected to the collector electrode of the transistor 5 by means of a coupling resistor 18 and a capacitor 19. The capacitor 19 acts as a speed-up capacitor which decreases the turn-off of the Darlington pair by acting as a low impedance discharge circuit for the minority carriers in the base capacitance.

The value of the resistor 9 is selected to dynamically match the impedance of the transducer 2 and its damping resistor 17 at the selected operating frequency. With the two impedance legs matched, the current through the inductor 7 does not see a changing load between the on and off portions of the cycle. In this manner resistor 9 limits all "pattern sensitivity" at the selected operating frequency. The resistor 9 also forms an amplitude limiter for the drive current.

The resistor 9 can be dynamically balanced with respect to the transducer 2 but substantially only at a predetermined frequency. In the event that the circuit is operated at a repetition rate or frequency which is substantially different from that for which it was designed, it becomes "pattern sensitive," since it will see a different load during the turn-on and turn-off portions of the cycle.

The value of the resistance 9 required to match the load follows this general relationship:

$$R \propto f L_3$$

where $f$ is the basic delay line operating frequency. Therefore, as the frequency is increased, R will also increase.

The operation of the improved driver of FIG. 1 is as follows. When the driver is in the off stage, that is, there is no current flowing through the transducer 3, the voltage applied to the input terminal 10 is positive, thereby forward biasing the base-emitter junctions of the transistors 11 and 5. The transistor 5 is operated in saturation, whereby a current of predetermined value flows from the positive supply terminal 6 through the resistor 8, the inductor 7, the resistor 9 and the collector-to-emitter path to ground potential. At this time, the transistors 15 and 16 are nonconducting.

When the input signal level at the terminal 10 goes to ground potential, the base-emitter junctions of the transistors 11 and 5 become reverse biased and the transistor 5 turns off. The potential at the collector electrode of the transistor 5 goes positive to turn on the transistors 15 and 16. Current will now flow through the resistor 8, the inductor 7, the parallel circuit comprising the resistor 17 and the transducer 2 and through the transistors 15 and 16 to ground potential.

The inductance of the inductor 7 is relatively high compared to the inductance of the transducer 2. The ratio of the inductances is preferably in the order of 10:1 or greater. Consequently, the Law of Constant Flux Linkages comes into play when the current is switched from the transistor 5 to the transistors 15 and 16. That is, the current flowing through the inductor 7 will not vary appreciably. Ignoring for the sake of simplicity, the small value of the current flowing through the damping resistor 17 and specifying the value of the inductor 7 as $L_1$ and that of the inductance 3 as $L_2$, the following equation will hold true:

$$I_1 \times L_1 = I_2(L_1 + L_2)$$

Since $L_1$ is much greater in value than $L_2$, the value of $I_2$ is approximately equal to the value of $I_1$. Further, since the current flowing through $L_1$ is constant during the switching time, the current through $L_2$ will rise rapidly and is dependent only upon the turn-off time of the transistor 5 and the turn-on time of the switch comprising the transistors 15 and 16.

Because $L_1$ does not permit any appreciable change in the current flowing through it, the initial on current is the same as the off current. The naturally long time constant of the current source will maintain this current level during the pulse duration.

In the on state of the driver, the transistor 15 is allowed to saturate so that the collector-to-emitter voltage of the transistor 16 is well defined. The latter transistor is operated out of the saturation region.

Figure 3:
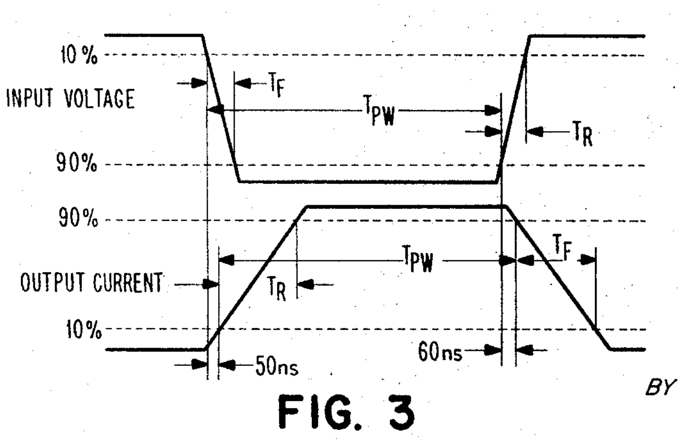
FIG. 3 shows illustrative waveforms achieved by a physical embodiment of the circuit of FIG. 1.

One physical realization of the driver circuit of FIG. 1 which provided reliable operation utilized the component values set forth below; however, it will be appreciated that they are given by way of example and that the invention is not to be limited thereto. This driver assures reliable operation of transducers having an inductance 3 between 17 and 28 microhenries, a resistance 4 between 15 and 70 ohms and stray capacitance equal to or less than 50 picofarads. FIG. 3 illustrates current output signals of this driver obtained in response to certain voltage input signals having a 1 megacycle repetition rate. The input signals at the terminal 10 had a nominal pulse width $T_{PW}$ of approximately 500 nanoseconds, and the rise and fall times $T_R$ and $T_F$ of the pulse were in the order of 30 nanoseconds. The output pulse traversing the coil of the transducer had a maximum value of about 50 milliamperes, a pulse width $T_{PW}$ of about 500 nanoseconds and rise and fall times $T_R$ and $T_F$ were in the order of 140 nanoseconds. The leading and trailing edges of the current pulse through the transducer were delayed approximately 50 and 60 nanoseconds respectively.

| | | Values |
|---|---|---|
| Resistors: | | |
| **8** | ohms | 37 |
| **9** | do | 62 |
| **13** | do | 27 |
| **17** | do | 620 |
| **18** | do | 4300 |
| Capacitor: | | |
| **19** | picofarads | 20 |
| Inductor: | | |
| **7** | microhenries | 470 |

The circuit of FIG. 1 is adapted for operation in the return-to-zero mode, i.e. a logic "0" is represented by a positive potential at the input terminal 10 and a logic "1" bit is represented by a negative-going pulse applied to the terminal 10.

Other applications require a non-return-to-zero mode of operation, i.e. a logic "0" is characterized by a continuous unchanging value of potential at either of two levels, and a logic "1" is characterized by a change in either direction from one potential level to the other.

Figure 2:
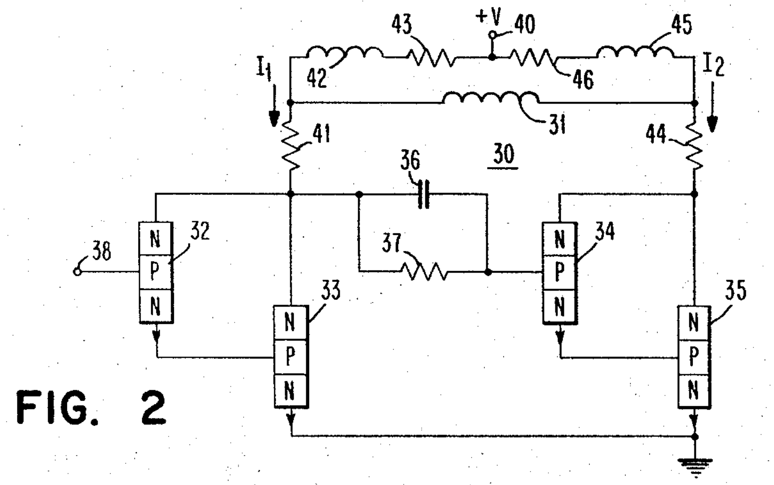
FIG. 2 is a schematic diagram of an alternate form of the present invention.

The embodiment set forth in FIG. 2 has been particularly adapted for use with a non-return-to-zero mode of operation.

FIG. 2 shows a driver 30 for the transducer drive coil 31 of a magnetostrictive delay line. The improved driver includes a first switch comprising a pair of transistors 32 and 33 arranged in the form of a Darlington pair and a second switch comprising a pair of transistors 34 and 35 also arranged in the form of a Darlington pair.

The collector electrodes of the transistors 32 and 33 are connected to the base electrode of the transistor 34 by way of a resistor 37 and a speed-up capacitor 36. The collectors of the transistors 32 and 33 are also connected to a positive supply terminal 40 by way of a resistor 41, an inductor 42 and a resistor 43. The collector electrodes of the transistors 34 and 35 are connected to the terminal 40 by way of a resistor 44, an inductor 45 and a resistor 46. The transducer coil 31 is connected between the junctions of the resistor 41 and coil 42 and the resistor 44 and the inductor 45.

It will be recalled that the driver of FIG. 2 has been adapted for use with non-return-to-zero mode of operation. Consequently, there are no defined pulse widths; and the potential level at the input terminal 38 will remain at the same level following a logic "1" until the next logic "1" appears to switch the circuit to the opposite level. As a result, it is necessary that the circuit need not be designed for a particular frequency. The circuit of FIG. 2 has met these requirements.

In the embodiment of FIG. 2, two constant current sources are used; and the currents are alternatively passed through the transducer coil in opposite directions to give an effective drive twice that of the drive in the circuit of FIG. 1. The resistor 43 and the inductor 42 provides a constant current $I_1$. The resistor 46 and the inductor 45 provide a constant current $I_2$. The corresponding resistors and inductors in the two legs going from the supply terminal 40 to ground potential by way of either of the switches are made equal so that the current $I_1$ equals the current $I_2$. Thus the value of the resistor 43 equals the value of the resistor 46; the inductor 42 is substantially equal in value to the inductor 45 and the resistor 41 is substantially equal in value to the resistor 44.

Since the switch defined by the transistors 32 and 33, or alternatively the switch comprising the transistors 34 and 35 must be conducting while the other is nonconducting, one of the two currents $I_1$ or $I_2$ will be traversing the transducer coil 31 while the other of the two currents will be going directly through its respective electronic switch by way of its respective resistor 41 or 44. Since the current flowing through the transducer coil 31 is $I_1$ or $I_2$, the change in current in the transducer coil 31 in response to a logic "1" will at all times be equal to the sum of the currents $I_1$ and $I_2$.

If the values of the inductors 42 and 45 are made high relative to the value of the inductance of the transducer coil 31, the rise and fall times of the currents through the transducer coil 31 are dependent almost entirely upon the switching speeds of the Darlington pairs and the input signal waveform.

However, in the event that the values of the inductors 42 and 45 are reduced, the time constants of the circuit are such that the switching speeds will also be dependent upon the time constants of the inductors and their resistances. In either event, the circuits are operable to achieve the desired results in this embodiment.

In this embodiment, the magnitude of the drive current through the coil 31 is not dependent upon the width of the drive pulse since, as the circuit is switched from one state to the other, one of the two equal currents $I_1$ or $I_2$ is decreasing and the other current is proportionately increasing.

It will also be noted that although this particular embodiment is well-adapted to operate in the non-return-to-zero mode, it can also be used in the return-to-zero mode of operation. In the latter instance, one of the two current directions will be assumed to be a logical "0" condition and the other direction will be assumed to be a logical "1" condition.

While the invention has been particularly shown and described with reference to preferred embodiments thereof, it will be understood by those skilled in the art that various changes in form and details may be made therein without departing from the spirit and scope of the invention.

What is claimed is:

1. Apparatus for driving an inductive load at high frequencies, comprising a constant current means including a low voltage source of energy and having an inductive impedance the value of which is sufficiently greater than that of the load to substantially inhibit rapid changes in current therein at the selected frequency of operation, a first path for the constant current including said load and a first high speed transistor switch connected in series, a second path for the constant current including a second high speed transistor switch connected to the constant current means for diverting the current from the first path, and means adapted for connection with a source of signals to energize the first or second switch alternatively.

2. Apparatus for driving the transducer coil of a magnetostrictive delay line, comprising a constant current means including a low voltage source of energy having a pair of terminals and including a resistive-inductive impedance, having a minimum value of inductance in the order of ten times that of the coil, connected between one terminal of the source and one end of the coil, a first transistor switch having collector and emitter electrodes connecting the other end of the coil to the other terminal of the source and having a base electrode, a conductive element, the dynamic impedance of which substantially matches that of the coil at a selected operating frequency, having one end connected to the junction between the constant current means and the coil, a second transistor switch having collector and emitter electrodes connecting the other end of the conductive element to the other terminal of the source and having a base electrode, means coupling the collector electrode of the second switch to the base electrode of the first switch and effecting rapid turn-on and turn-off of the first switch in response to turn-off and turn-on of the second switch, means, adapted to receive bivalued signals for alternatively energizing or de-energizing the second switch, effecting slower-turn-on of the second switch.

3. Apparatus for driving the transducer coil of a magnetostrictive delay line, comprising a constant current means including a low voltage source of energy having a pair of terminals and including a constant current producing means, having an inductance substantially greater in value than that of the coil, connected between one terminal of the source and one end of the coil, a first transistor switch connected to the other end of the coil and to the other terminal of the source, a conductive element, the dynamic impedance of which substantially matches that of the coil, having one end connected to the junction between the constant current means and the coil, a second transistor switch connected to the opposite end of the conductive element and to the other terminal of the source, and means adapted to receive bivalued signals for alternatively energizing one or the other of the switches.

4. Apparatus for driving the transducer coil of a magnetostrictive delay line comprising a constant current means including a low voltage source of energy having a pair of terminals and including a resistive-inductive impedance, having a minimum value of inductance in the order of ten times that of the coil, connected between one terminal of the source and one end of the coil, a first transistor switch connected to the other end of the coil and to the other terminal of the source, a conductive element, the dynamic impedance of which substantially matches that of the coil, having one end connected to the junction between the constant current means and the coil, a second transistor switch connected to the opposite end of the conductive element and to the other terminal of the source, and means adapted to receive bivalued signals for alternatively energizing the first or second switch.

5. Apparatus for driving the transducer coil of a magnetostrictive delay line, comprising a constant current means including a low voltage source of energy having a pair of terminals and including a resistive-inductive impedance, having a minimum value of inductance in the order of ten times that of the coil, connected between one terminal of the source and one end of the coil, a first transistor switch connected to the other end of the coil and to the other terminal of the source, a conductive element, the dynamic impedance of which substantially matches that of the coil at a selected operating frequency, having one end connected to the junction between the constant current means and the coil, a second transistor switch connected to the opposite end of the conductive element and to the other terminal of the source, and means adapted to receive bivalued signals for alternatively energizing the first or second switch.

No references cited.

MILTON O. HIRSHFIELD, *Primary Examiner.*

J. A. SILVERMAN, *Assistant Examiner.*